United States Patent Office 2,940,959
Patented June 14, 1960

2,940,959

CURING OF POLYSULFIDE POLYMERS WITH MANGANITE COATED MnO$_2$

Norman A. Rosenthal, Levittown, and Julian R. Panek, Yardley, Pa., and Keith R. Cranker, Trenton, N.J., assignors to Thiokol Chemical Corporation, Trenton, N.J., a corporation of Delaware No Drawing. Filed May 7, 1957, Ser. No. 657,491

4 Claims. (Cl. 260—79.1)

This invention relates to cured polysulfide polymers, to methods of curing polysulfide polymers, and to a novel agent for effecting polysulfide polymer cures.

Polysulfide polymers of the type disclosed in Patrick and Ferguson Patent 2,466,963 are now well known in the art and have been extensively used for a variety of commercial applications. When cured to form rubberlike solids, they possess a number of commercially important properties. They are inert to oil, most solvents, water and mild acids and alkalides, as well as to ozone and sunlight. They are tough and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties, they have been extensively used as impregnating, sealing, caulking and coating materials as well as for a variety of special uses such as gasoline hose, printers rolls and potting compounds for electrical components.

The polysulfide polymers are characterized by the fact that they have recurring polysulfide linkages between organic radicals having at least two primary carbon atoms for connection to the disulfide linkages. Thus, for example, disulfide polymers have a general structure corresponding to the formula

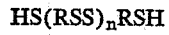

$$HS(RSS)_nRSH$$

in which the R's are organic radicals, preferably predominantly divalent aliphatic radicals such as diethyl formal radicals, and $n$ is an integer which may vary from a relatively small number in the case of liquid polymers having a molecular weight of about 1000 to 1200 to a relatively large number in the case of solid polymers which may have a molecular weight of 100,000 or more. These polysulfide polymers are preferably formed by reaction of a dihalide corresponding to R with a polysulfide in the presence of a relatively minor amount of a polyfunctional cross linking agent such as trichloropropane, either with or without subsequent splitting of the polymer to form liquid polymers as described in Patrick and Ferguson Patent 2,466,963.

Methods and materials for effecting a cure of such polysulfide polymers have heretofore been proposed. Thus, for example, oxidizing agents of various types have been suggested in the aforementioned patent to Patrick and Ferguson. Cures effected with such oxidizing agents have, however, left something to be desired. Thus, for example, even the most successful curing agent heretofore proposed and used on a large scale, namely lead peroxide, has resulted in cured polysulfide polymers having considerably less stability at elevated temperatures than required for many potential applications. Moreover, such polymers have not been as resistant to "cold flow," i.e., permanent deformation when subjected to pressure at ambient temperatures, as is desirable. In addition, the curing of low molecular weight, i.e., approximately 1000 to 1200, polysulfide polymers with oxidizing agents such as lead peroxide has been impractical because of the extremely rapid rate of cure, in some instances being so vigorous as to be spontaneously combustible, and the inability to exert any control over the set-up time and rate of cure.

We have made the surprising discovery that polysulfide polymers, including especially polymers having low molecular weights of the order of about 1200, can be effectively and controllably cured to form solid, rubberlike polysulfide resins of superior temperature stability by intimately admixing with such polymers a manganese dioxide activated for that purpose by the formation of an alkali manganite on the surface of the manganese dioxide. We have also found that an activated manganese dioxide capable of accelerating and effecting a cure of polysulfide polymers of molecular weights as low as about 1000 and as high as 100,000 and possibly 500,000 or 600,000 can readily be prepared by precipitating manganese dioxide from an alkali metal permanganate solution under alkaline conditions.

The controllability of cures effected with manganese dioxide having a surface coating of alkali metal manganite, particularly in the case of lower molecular weight polysulfide polymers, is most surprising inasmuch as neither manganese dioxide by itself nor an alkali metal manganite by itself produces an equivalent cure. Perhaps even more surprising is the fact that the cured polysulfide polymers, in contradistinction with the same polysulfide polymers cured by conventional means, possess appreciably higher thermal stability and less susceptibility to "cold flow."

Activated manganese dioxide is prepared, in accordance with a preferred embodiment of the method of the invention, by treating an alkali metal permanganate such as sodium and potassium permanganate with an alkali metal sulfite and an alkali metal hydroxide in an aqueous solution under such conditions as to keep the reaction mixture from developing, due to the exothermic nature of the reaction, a temperature higher than about 106° C., removing the precipitated manganese dioxide by filtration or other equivalent means and preferably washing the precipitate until the pH of the wash liquid is reduced to no less than about 7 to 8 and preferably about 8 to 10.

Examination of the manganese dioxide obtained in accordance with this procedure indicates that it is composed of minute particles of manganese dioxide having a relatively large surface area coated with an alkali metal manganite. Tests have revealed that control of curing rates with the activated manganese dioxide of the invention can readily be effected, the rate being retarded in the presence of materials such as stearic acid, ammonium salts, nitro compounds, alums, etc. and accelerated in the presence of amines, alkali metal oxides and hydroxides, and the like.

By way of example, to illustrate the best mode now contemplated of preparing manganese dioxide activated for the purpose of effecting a polysulfide polymer cure, 632 grams KMnO$_4$ and 1600 ml. of water in a five-liter flask were heated to 60° C. The flask was then removed from the heat source and a solution containing 250 grams Na$_2$SO$_3$ in one liter of water was added. During this addition, the temperature rose to 96° C., at which time a solution containing 150 grams NaOH in 500 ml. water was added. The purple solution following this treatment became brownish purple. 500 grams Na$_2$SO$_3$ were then slowly dusted into the solution while stirring, the rate of addition being adjusted so that the temperature remained below 106° C. A solution of 150 grams NaOH in 200 ml. water was then added, the pH of the resulting solution being 11.0. 265 grams of KMnO$_4$ were slowly added to the reaction mixture followed by addition of a solution of 100 grams NaOH in 250 ml. water. 400 grams Na$_2$SO$_3$ were then added slowly while the temperature rose to 102° C. and the color changed to a greenish brown. Finally, an additional 600 grams Na₂SO₃ were slowly added, at which point the color of the solution changed to a deep brown without a change in temperature. The solution was then cooled to room temperature and filtered with a Buchner funnel, the total amounts of reactants used being:

|  | Grams |
|---|---|
| NaOH | 400 |
| KMnO₄ | 897 |
| Na₂SO₃ | 1750 |
| H₂O | 3550 |

An MnO₂ precipitate was then removed from the filter and washed with distilled water until the pH of the wash liquid was reduced to about 8, dried, washed with acetone and finally air-dried to yield 680 grams of activated manganese dioxide.

In effecting a cure of polysulfide polymer in accordance with the method of the invention the polymer, the activated MnO₂, and other materials such as fillers, accelerators or retarders and the like are intimately admixed in any suitable mixing device such as a paint mill and then allowed to cure at room or elevated temperatures. The proportions of MnO₂ utilized in accordance with this method are not critical and may vary considerably, depending upon the particular polymer and curing conditions. Generally, however, about 4 to 10% are considered optimum.

The advantages of utilizing activated MnO₂ as a curing agent are many. Methodwise, it makes possible for the first time a room temperature cure at a practicable rate of low molecular weight polysulfide polymers and a more effective control of curing rate than hitherto possible with polysulfide polymers of higher molecular weight, i.e., of about 4000 or greater. Productwise, one of the primary advantages is that the cured, rubber-like polysulfide polymers, regardless of initial molecular weight, have enhanced thermal stability not hitherto obtainable by other methods. For example, when the cured polymers are maintained at temperatures of 250° F. to 300° F. they retain a substantial proportion of their hardness and tensile strength for much longer periods of time than do polymers cured by methods proposed heretofore.

These and other advantages, as well as the utility of the invention, will become further apparent from the following examples included to illustrate the best modes now contemplated for carrying out the curing operation. In these examples the liquid polymer formulations indicated were mixed on a paint mill and the solid polymers were mixed on a rubber mill. The mixture in each instance made three passes through the mill and was then cured in cups as indicated. The polysulfide polymers identified in these formulations as Polymers I to III are well known condensates of dichloroethyl formal and 0.5 to 2 mol percent of trichloropropane (as cross linking agent) with sodium disulfide having a basic structural formula $$HS(C_2H_4OCH_2OC_2H_4SS)_nC_2H_4OCH_2OC_2H_4SH$$

in which the average molecular weights are approximately as follows:

| Polymer | Average Molecular Weight |
|---|---|
| I | 1,200 (liquid). |
| II | 4,000 (liquid). |
| III | over 100,000 (solid). |

The MnO₂ was prepared in the manner already described 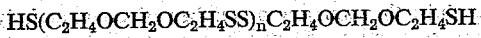

Polymer I

|  | A | B | C | D |
|---|---|---|---|---|
| Formulation, p.b.w.: |  |  |  |  |
| Polymer | 100 | 100 | 100 | 100 |
| TiO₂ | 50 | 50 | 50 |  |
| Carbon Black |  |  |  | 25 |
| MnO₂ | 6 | 4 | 6 | 6 |
| Dinitrobenzene | 4 | 4 | 2 |  |
| Set: Time, hrs | 0.5 | 1 | 0.5 | 0.25 |
| Cure: Time, hrs. at RT | 2.5 | 3 | 2.5 | 0.5 |

|  | After— | After Cure | After— | After— |  |  |
|---|---|---|---|---|---|---|
|  | Cure | 1 mo. at 250° F. |  | Cure | 1 mo. at 250° F. | Cure | 70 hrs. at 300° F. |
| Properties: |  |  |  |  |  |  |  |
| Tensile Strength, p.s.i | 300 | 250 | 370 | 350 | 330 | 400 | 315 |
| Elongation, Percent | 850 | 200 | 750 | 1,000 | 150 | 500 | 220 |
| Hardness, Shore A | 47 | 45 | 50 | 37 | 52 | 45 | 41 |

Polymer II

|  | E | F | G | H |
|---|---|---|---|---|
| Formulation, p.b.w.: |  |  |  |  |
| Polymer | 100 | 100 | 100 | 100 |
| TiO₂ | 50 | 50 | 50 |  |
| Carbon Black |  |  |  | 25 |
| MnO₂ | 6 | 10 | 6 | 1.5 |
| Trinitrobenzene | 4 |  |  |  |
| Dinitrobenzene |  |  | 2 | 0.5 |
| Pyridine |  | 0.4 |  |  |
| MgO |  |  |  | 3 |
| Set: Time, hrs |  |  | 1 | 0.5–2 |
| Cure: |  |  |  |  |
| Time, hrs | 16 | 48 | 4.5 | 6 |
| Temperature, °F | 158 | 158 | RT | RT |

|  | After Cure | After 1 mo. at 212° F. | After Cure | After 1 mo. at 250° F. | After Cure [1] | After 1 wk. at 250° F. |
|---|---|---|---|---|---|---|
| Properties: |  |  |  |  |  |  |
| Tensile Strength, p.s.i | 245 | 345 | 350 | 325 | 400 | 450 |
| Elongation, Percent | 300 | 450 | 1,000 | 130 | 375 | 650 |
| Hardness, Shore A | 38 | 42 | 37 | 53 | 44 | 42 |

[1] Molded at 310° F.

in detail. The cured samples were molded into sheets in a press at 287° F. for ten minutes and tested on a Scott tester and Shore durometer.

*Polymer III*

| | J | K | L |
|---|---|---|---|
| Formulation, p.b.w.: | | | |
| Polymer | 100 | 100 | 100 |
| Carbon Black | 60 | 60 | 60 |
| MnO₂ | 5 | 7.5 | 10 |
| ZnO₂ | 3 | | 1 |
| Stearic Acid | 1 | 3 | 1 |
| Cure: Time, minutes at 310° F | 30 | 30 | 30 |
| Properties After Cure: | | | |
| Tensile Strength, p.s.i. | 950 | 725 | 1,300 |
| Elongation, Percent | 300 | 200 | 300 |
| Hardness, Shore A | 66 | 65 | 66 |

It will be abundantly clear, from a consideration of the data in the foregoing tables, that the curing conditions, when manganese dioxide activated in accordance with the invention is used, are most attractive and that the physical properties of the cured polymers immediately after the cure as well as after considerable aging at elevated temperatures are surprisingly good. The substantial retention of important physical properties in the face of the severe high temperature aging tests to which these cured polymers were subjected and the controlled rapidity with which the liquid polymers having average molecular weights of 1200 and 4000 were cured at room temperature are believed to represent outstanding achievements with polysulfide polymers of this general type. In addition, tests have shown that polymers cured in accordance with the method of the invention have very desirable and unexpected resistance to jet fuels which, because of their content of active mercaptans, have hitherto been quite destructive.

It is to be expected that numerous modifications will readily become apparent to those skilled in the art upon reading this description. All such modifications are intended to be included within the scope of the invention as defined in the appended claims.

We claim:
1. Method for curing polysulfide polymers of the formula

$$HS(RSS)_nRSH$$

wherein R is a divalent aliphatic radical selected from the group consisting of alkylene, oxahydrocarbon and thiahydrocarbon radicals and the molecular weight is upwards of about 1000 which comprises admixing therewith an alkali manganite-coated manganese dioxide curing agent comprising minute particles of MnO₂ having a relatively large surface area coated with an alkali metal manganite, said curing agent being in an amount sufficient to oxidize substantially all the free SH groups present in the uncured polymer.

2. Method as defined in claim 1 wherein the amount of curing agent is between about 4 and 10% by weight of the uncured polymer.

3. A cured, rubber-like polymer prepared by admixing a polysulfide polymer of the formula $$HS(RSS)_nRSH$$

wherein R is a divalent aliphatic radical selected from the group consisting of alkylene, oxahydrocarbon and thiahydrocarbon radicals, said polymer having a molecular weight upwards of about 1000, with an alkali manganite-coated manganese dioxide curing agent comprising minute particles of MnO₂ having a relatively large surface area coated with an alkali metal manganite, the amount of said curing agent being sufficient to oxidize substantially all the free SH groups present in the initial polymer.

4. A cured, rubber-like polymer prepared by admixing a polysulfide polymer of the formula $$HS(RSS)_nRSH$$

wherein R is a divalent aliphatic radical selected from the group consisting of alkylene, oxahydrocarbon and thiahydrocarbon radicals, said polymer having a molecular weight upwards of about 1000, with an alkali manganite-coated manganese dioxide curing agent comprising minute particles of MnO₂ having a relatively large surface area coated with an alkali metal manganite, the amount of said curing agent being sufficient to oxidize substantially all the free SH groups present in the initial polymer, said curing agent being prepared by precipitation of manganese dioxide from an aqueous alkali permanganate solution by addition thereto of an alkali metal sulfite.

References Cited in the file of this patent
UNITED STATES PATENTS

| 1,937,488 | Jenness | Nov. 28, 1933 |
| 2,195,380 | Patrick | Mar. 26, 1940 |
| 2,206,643 | Patrick | July 2, 1940 |
| 2,221,650 | Patrick | Nov. 12, 1940 |
| 2,507,502 | Corner et al. | May 16, 1950 |
| 2,553,501 | Corner et al. | May 22, 1951 |
| 2,728,748 | Davis | Dec. 27, 1955 |